April 22, 1930.  A. T. BROWN  1,755,767
MOTOR AGRICULTURAL MACHINE
Filed March 21, 1923
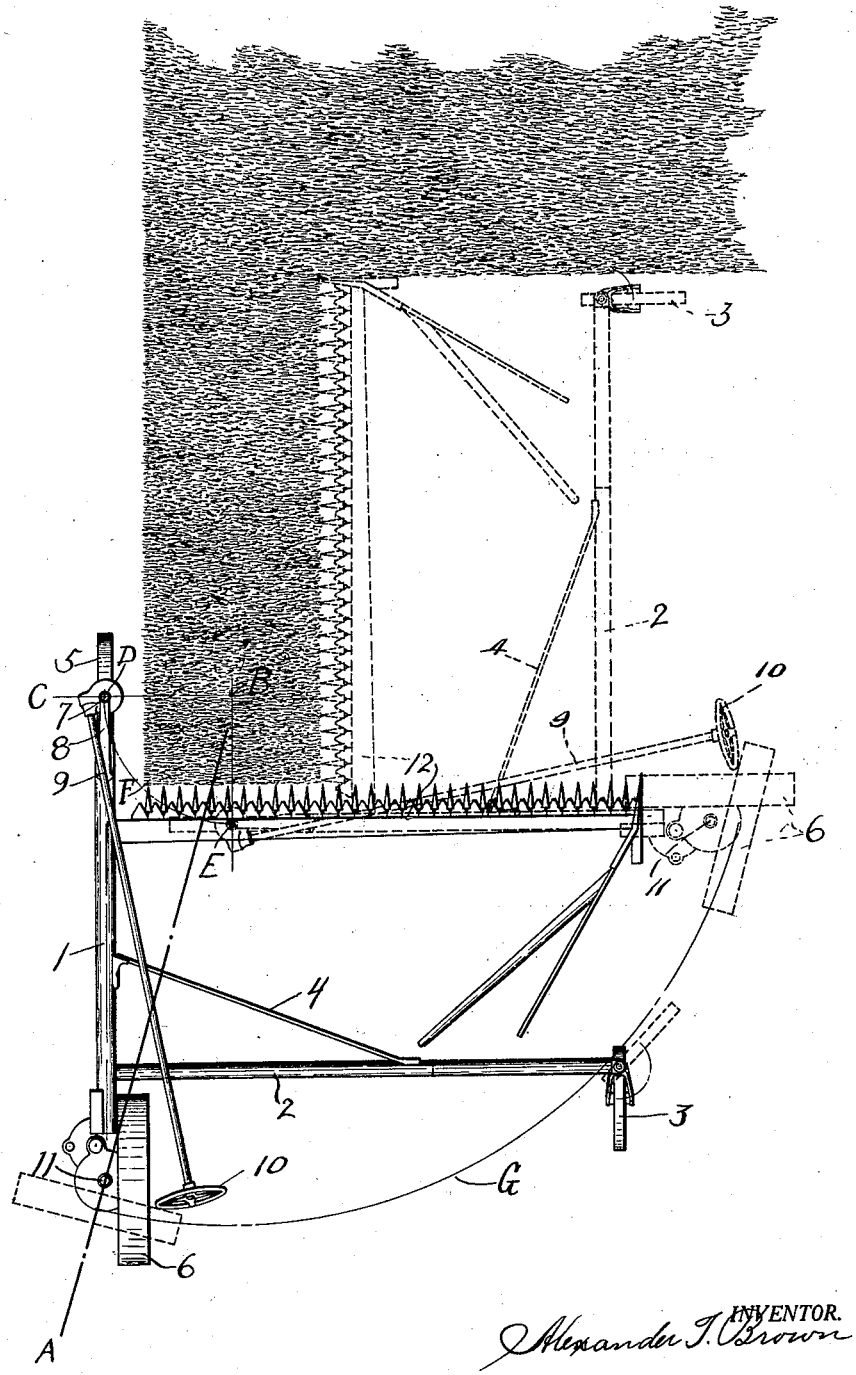
INVENTOR.
Alexander T. Brown
BY
Parsons Bodell
ATTORNEYS Patented Apr. 22, 1930

1,755,767

UNITED STATES PATENT OFFICE

ALEXANDER T. BROWN, OF SYRACUSE, NEW YORK

MOTOR AGRICULTURAL MACHINE

Application filed March 21, 1923. Serial No. 626,545.

This invention relates to motor agricultural machines of the type having a rear tractor and corner turning wheel and a laterally extending implement as a mower bar such as set forth in patent to Brown, No. 1,247,073, dated November 20, 1917; and has for its object a relative arrangement of the front wheel, tractor and corner turning wheel and mower bar, by which the machine can be turned at a corner before the knife has cut a swath entirely through the standing grain or grass along one side of the uncut crop, and the front end of the machine moved forwardly around the corner and the knife positioned contiguous to the end of the uncut swath at the corner so that when the machine is started forwardly, the knife immediately enters the uncut portion of such swath; thus avoiding loss of time maneuvering at corners and in moving the machine and knife up to the uncut crop, and raising the bar.

In describing my invention, reference is had to the accompanying drawing which is a plan view of a motor mower embodying my invention, the standing crop being shown and the position of the machine prior to turning the corner being shown in dotted lines.

The motor agricultural machine here illustrated as a mower, comprises a lengthwise main frame having front and rear wheels which normally travel in the same or approximately the same path along the edge of the uncut crop, the rear wheel being a tractor and corner turning wheel which in addition to rolling about its axis of rotation is turnable about an upright axis from straight position whereby both front and rear wheels travel in an arc having substantially the same center but have their radii extending in different directions or sectors whereby the front advances forwardly around the corner of the standing crop, and a mower bar or knife or other cutter extending transversely of and preferably laterally from the main frame, in the rear of the axis of rotation of the front wheel.

1 designates the main frame which is here shown as a lengthwise tubular bar. 2 is a frame bar extending laterally from near the rear end of the bar 1 and having a castor wheel 3 at its outer end. A suitable inclined brace 4 connects the bars 1, 2.

5 is the front wheel, and 6 the rear wheel, the wheel 5 being usually in line with the bar 1 and carried by a fork having an upright spindle 7 journaled in a bearing at the front end of a bracket 8 at the front end of the bar 1. The wheel 5 is for all general steering purposes as when running to and from the field, along roads and lanes and along the rows of grass or grain, or the edge of the uncut crop, and for this purpose is provided with a steering rod 9 connected to the spindle 7 in any suitable manner, and having a tiller wheel 10 at its rear end.

The tractor and corner turning wheel 6 is mounted to rotate or roll about its own axis and also to turn about the axis of an upright spindle 11 from its normal position straight with the front wheel or with its axis of rotation parallel with that of the front wheel into an angular position in which its axis of rotation is at an angle to that of the front wheel.

The tractor wheel is driven from an engine through motion transmitting mechanism, (not shown), of any suitable construction, mounted on the frame; and is controlled by mechanism and latches (not shown) of any suitable construction, one form being shown in said patent.

The wheel 6 is movable about its axis 11 so that its horizontal axis of rotation A—B when in its extreme angular position extends in a vertical plane intersecting the mower knife and to that side of the wheel 5, on which the knife is located, that is, the right hand side. As here illustrated, such axis A—B extends obliquely crosswise of the frame bar 1 from the outside, or left hand side of the rear end of the bar 1 to the right hand side of the front end of said bar 1, and the wheel 5, so that when the machine is turned after the wheel 6 has reached its full angular position, the wheel 5 travels or advances forward in an arc E D and turns the corner F of the uncut crop, and the rear wheel 6 travels in an arc G having the same center B as the arc E D, these arcs G and E D being located in different quadrants or sectors and the quadrant or sector of the arc G lapping that of the arc E D.

12 is the mower knife extending laterally from the frame bar 1 from a point located in the rear of the axis C B so that when the machine is turned from the position indicated in dotted lines to that shown in full lines the knife 12 comes in position to enter the uncut crop immediately when the machine is started forwardly so that no time is lost moving the knife over stubble or cut crop up to the uncut crop, and raising the bar.

The movable parts of the cutting mechanism are actuated in any well known manner from the motor.

In operation, the driver who is seated on a seat at the rear of the frame bar 2 drives the machine to cut a swath along one side of the standing grass or grain until the standing grass or grain is nearly cut through and the front wheel is nearly at the corner. He then operates the controlling mechanism for turning the wheel to angular position. When the wheel is stopped in angular position, the rear of the machine swings in the arc G and the wheel 5 advances around the corner in the arc E D without operating the tiller wheel 10 and without raising the bar. When the frame 1 is straight with the edge of the uncut crop after the wheel 5 has turned the corner, the knife is ready to enter the standing grass or grain without manipulating the bar, without further maneuvering, and without moving the machine up to the standing grass or grain. In horse drawn, and tractor drawn and other motor mowing machines, when the machine is shifted in maneuvering or turning a corner, the outer shoe of the mower knife sweeps into the uncut crop, unless the bar is raised, and the machine must be moved a considerable distance to bring the knife up to the standing crop.

By my mower much time and labor is saved as maneuvering at the corner is eliminated and also damage to the standing and cut crop avoided.

The operator again operates the control for the wheel 6 so that it first turns back to straight position and then propels the machine straight forwardly. The tiller wheel is operated to guide the machine parallel along the edge of the standing crop. Owing to the relative arrangement of the front and rear wheels and the mower knife and to the angular position of the wheel 6, the machine can be quickly turned around the corner and positioned without maneuvering, or raising or lowering the bar.

What I claim is:

In a motor mowing machine, a lengthwise main frame having a supporting wheel at its front end and a corner turning and tractor wheel at its rear end arranged to normally move in a straight line one behind the other, a mower knife extending laterally from the main frame in the rear of the axis of rotation of the front wheel and near the front end of the frame, the tractor and corner turning wheel being movable into an angular radial position whereby it travels in an arc having approximately the same center as the arc of travel of the front wheel when the machine is turning a corner, the rear corner turning and tractor wheel when in angular position being so arranged relatively to the front wheel that a continuation of the axis of rotation of the rear wheel intersects a continuation of the axis of rotation of the front wheel when in straight position at a point on the inner side of the frame in front of the mower knife whereby both front and rear wheels travel when turning a corner in arcs having approximately the same center located on the inner side of the front wheel in front of the mower knife.

In testimony whereof, I have hereunto signed my name, at Syracuse, in the county of Onondaga and State of New York, this 1st day of February, 1923.

ALEXANDER T. BROWN.